(12) United States Patent
Kwon et al.

(10) Patent No.: US 8,743,724 B2
(45) Date of Patent: Jun. 3, 2014

(54) METHOD AND APPARATUS FOR TRANSMITTING SIGNAL USING SPATIAL SILENCING

(75) Inventors: Yeong Hyeon Kwon, Anyang-si (KR); Moon Il Lee, Anyang-si (KR); Ja Ho Koo, Anyang-si (KR); Jae Hoon Chung, Anyang-si (KR); Sung Ho Moon, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 75 days.

(21) Appl. No.: 13/322,129

(22) PCT Filed: May 28, 2010

(86) PCT No.: PCT/KR2010/003418
§ 371 (c)(1),
(2), (4) Date: Nov. 22, 2011

(87) PCT Pub. No.: WO2010/137917
PCT Pub. Date: Dec. 2, 2010

(65) Prior Publication Data
US 2012/0076039 A1    Mar. 29, 2012

Related U.S. Application Data

(60) Provisional application No. 61/182,113, filed on May 29, 2009.

(30) Foreign Application Priority Data

May 28, 2010 (KR) ........................ 10-2010-0050223

(51) Int. Cl.
*H04W 72/04* (2009.01)
*H04B 7/06* (2006.01)

(52) U.S. Cl.
CPC .................................. *H04B 7/0634* (2013.01)
USPC ........................... 370/252; 370/329; 370/330

(58) Field of Classification Search
None
See application file for complete search history.

(56) References Cited

U.S. PATENT DOCUMENTS

2001/0038356 A1* 11/2001 Frank ............................ 343/853
2006/0039493 A1*  2/2006 Mukkavilli et al. ........... 375/267

(Continued)

FOREIGN PATENT DOCUMENTS

CN        101384023        3/2009
JP        10-190625        7/1998

(Continued)

OTHER PUBLICATIONS

Qualcomm Europe, "Carrier Aggregation in Heterogeneous Networks," 3GPP TSG RAN WG1 #57, R1-092239, May 2009, 12 pages.

*Primary Examiner* — Hassan Kizou
*Assistant Examiner* — Tejis Daya
(74) *Attorney, Agent, or Firm* — Lee, Hong, Degerman, Kang & Waimey

(57) ABSTRACT

The present invention relates to a method for transmitting signals in a heterogeneous network, the method comprising: a step wherein a base station determines a value-added vector for forming a beam pattern to be applied to a subsidiary carrier; a step wherein carrier operation information including information related to the determined value-added vector is transmitted via a primary carrier; and a step wherein the subsidiary carrier is transmitted by applying the determined value-added vector.

15 Claims, 9 Drawing Sheets

(56) References Cited

U.S. PATENT DOCUMENTS

| | | |
|---|---|---|
| 2008/0076477 A1 | 3/2008 | Hedayat et al. |
| 2008/0102898 A1* | 5/2008 | Na et al. ................. 455/562.1 |
| 2008/0117997 A1* | 5/2008 | Maltsev et al. ............ 375/267 |
| 2008/0130538 A1* | 6/2008 | Raissinia et al. ........... 370/310 |
| 2008/0311919 A1* | 12/2008 | Whinnett et al. ........... 455/447 |
| 2009/0257390 A1* | 10/2009 | Ji et al. ..................... 370/329 |
| 2010/0142455 A1* | 6/2010 | Imamura .................... 370/329 |

FOREIGN PATENT DOCUMENTS

| | | |
|---|---|---|
| JP | 2006-211366 | 8/2006 |
| JP | 2007-020160 | 1/2007 |
| JP | 2009-089188 | 4/2009 |
| JP | 2011-530238 | 12/2011 |
| KR | 1020080005685 | 1/2008 |
| WO | 2004/077712 | 9/2004 |
| WO | 2009/058906 | 5/2009 |

\* cited by examiner

METHOD AND APPARATUS FOR TRANSMITTING SIGNAL USING SPATIAL SILENCING

This application is the National Stage filing under 35 U.S.C. 371 of International Application No. PCT/KR2010/003418, filed on May 28, 2010, which claims the benefit of earlier filing date and right of priority to Korean Application Serial No. 10-2010-0050223, filed on May 28, 2010, and also claims the benefit of U.S. Provisional Application Ser. No. 61/182,113, filed on May 29, 2009, the contents of which are all incorporated by reference herein in their entirety.

TECHNICAL FIELD

The present invention relates to a signal transmission method and particularly to a signal transmission method and apparatus that can improve throughput in a heterogeneous network or a multiple-input multiple-output system.

BACKGROUND ART

Wireless communication systems have been widely deployed to provide various types of communication services such as audio or data services. A wireless communication system is generally a multiple access system which can support communication with multiple users by sharing available system resources such as bandwidth and transmission power. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system. In the wireless communication system, a User Equipment (UE) can receive information from a Base Station (BS) through a downlink (DL) and transmit information to the BS through an uplink (UL). The information transmitted or received by the UE includes data and various control information and various physical channels are provided depending on the types and usages of the information transmitted or received by the UE.

DISCLOSURE

Technical Problem

An object of the present invention is to provide a signal transmission method and apparatus which can minimize the effects of interference between multiple cells in a heterogeneous network.

Another object of the present invention is to provide spatial silencing for the same carrier shared by multiple cells so as to minimize the effects of interference between multiple cells in a wireless communication system.

Objects of the present invention are not limited to those described above and other objects will be clearly understood by those skilled in the art from the following description.

Technical Solution

In accordance with one aspect of the present invention to achieve the above objects, a method for a base station to transmit a signal in a heterogeneous network includes the base station determining a weight vector for forming a beam pattern to be applied to a subsidiary carrier, transmitting carrier operation information including information associated with the determined weight vector through a primary carrier, and transmitting the subsidiary carrier using the determined weight vector.

Here, the subsidiary carrier and the primary carrier may be carriers that are transmitted through different frequency segments from among a plurality of frequency segments which constitute an available system band.

In accordance with an embodiment of the present invention, the base station may selectively determine the weight vector for forming the beam pattern to be applied to the subsidiary carrier when a carrier used by a macro cell, which is supported by the base station, overlaps with a carrier used by small cells included in the macro cell.

In accordance with an embodiment of the present invention, determining the weight vector may include transmitting information associated with a weight vector set including one or more available weight vectors that can be applied to the subsidiary carrier to a plurality of user equipments through the primary carrier, receiving feedback information from the plurality of user equipments, and determining a weight vector specific to each user equipment from the weight vector set based on the feedback information.

In accordance with an embodiment of the present invention, the method may further include receiving feedback information including interference information associated with interference between a plurality of cells in association with channel measurement from a plurality of user equipments, and adjusting a region in which the subsidiary carrier is transmitted after being beamformed in a macro cell, whose service is supported by the base station, based on the interference information.

In accordance with an embodiment of the present invention, the method may further include determining a weight vector for forming a beamforming (beam or beam pattern) to be applied to a reference signal, transmitting reference signal operation information including at least one of information associated with an order of beamforming to be applied to the reference signal and information associated with the number of antennas, and transmitting the reference signal upon which the beamforming has been performed.

In accordance with an embodiment of the present invention, determining the weight vector for forming the beamforming to be applied to the reference signal may include determining the weight vector such that a different weight vector is applied to a cell common reference signal according to each of a plurality of frequency segments that constitute an available system band.

On the other hand, when a user equipment measures a carrier to which beamforming is to be applied, the user equipment may deliver information associated with a format, in which the carrier is transmitted to the user equipment, to the base station and the information may include information associated with resources such as time resources (for example, a transmission unit such as a subframe/frame), frequency resources (for example, a subcarrier, a subcarrier group, or a carrier or carrier group), or space resources (for example, a spatial layer), or code resources (for example, a spreading sequence, an orthogonal resource, or the like). Such information may be transmitted as a pure channel measurement result or as a subsidiary indication of a channel measurement when the user equipment reports a measurement value obtained through carrier measurement.

In accordance with an embodiment of the present invention, the method may further include transmitting, to a user equipment, information associated with subsidiary carrier transmission, the information including a weight vector for forming a beamforming to be applied to the subsidiary carrier and information associated with time/frequency resources to which a beamforming weight is applied, receiving feedback information including a result of channel measurement using the subsidiary carrier from the user equipment, and performing carrier aggregation upon the subsidiary carrier using the feedback information.

In accordance with another aspect of the present invention to achieve the above objects, a method for a user equipment to receive a signal in a heterogeneous network may include receiving carrier operation information including information associated with a weight vector determined for forming a beam pattern to be applied to a subsidiary carrier from a base station through a primary carrier, and receiving the subsidiary carrier to which the weight vector has been applied from the base station.

In accordance with an embodiment of the present invention, the method may further include receiving information associated with a weight vector set including one or more available weight vectors that can be applied to the subsidiary carrier from the base station through the primary carrier, receiving a downlink signal to which each weight vector included in the weight vector set has been applied from the base station, and transmitting feedback information associated with a result of channel measurement for the DL signal to the base station.

Here, the weight vector to be applied to the subsidiary carrier may be determined based on the feedback information.

In accordance with an embodiment of the present invention, the method may further include performing channel measurement using a downlink signal received from the base station, transmitting feedback information including interference information associated with interference between a plurality of cells in association with the channel measurement to the base station.

In accordance with an embodiment of the present invention, the method may further include receiving, from the base station, information associated with subsidiary carrier transmission, the information including a weight vector for forming a beamforming to be applied to the subsidiary carrier and information associated with time/frequency resources to which a beamforming weight is applied, transmitting the feedback information including the result of the channel measurement using the subsidiary carrier to the base station, and receiving the subsidiary carrier upon which carrier aggregation has been performed based on the feedback information.

Here, the subsidiary carrier and the primary carrier may be carriers that are transmitted through different frequency segments from among a plurality of frequency segments that constitute an available system band.

In accordance with another aspect of the present invention to achieve the above objects, a base station in a heterogeneous network may include a transmission module for transmitting a radio signal, a reception module for receiving a radio signal, and a processor for determining a weight vector for forming a beam pattern to be applied to a subsidiary carrier that is transmitted through the transmission module, wherein the processor transmits carrier operation information including information associated with the determined weight vector to a user equipment using a primary carrier through the transmission module and transmits the subsidiary carrier to the user equipment after applying the determined weight vector to the subsidiary carrier through the transmission module.

In accordance with another aspect of the present invention to achieve the above objects, a user equipment in a heterogeneous network may include a reception module for receiving a radio signal, a transmission module for transmitting a radio signal, and a processor for performing channel measurement based on a downlink signal received through the reception module, wherein the user equipment receives carrier operation information including information associated with a weight vector determined for forming a beam pattern to be applied to a subsidiary carrier from a base station using a primary carrier through the reception module and receives the subsidiary carrier to which the weight vector has been applied.

In accordance with an embodiment of the present invention, when the user equipment has received information associated with a weight vector set including one or more available weight vectors that can be applied to the subsidiary carrier from the base station using the primary carrier through the reception module and has then received a downlink signal to which each weight vector included in the weight vector set has been applied, the processor may perform channel measurement of the downlink signal to which each weight vector included in the weight vector set has been applied and generate feedback information associated with a result of the channel measurement and transmit the feedback information to the base station through the transmission module.

In accordance with an embodiment of the present invention, when the user equipment has received a weight vector for forming a beamforming to be applied to the subsidiary carrier and information associated with time/frequency resources to which a beamforming weight is applied from the base station through the reception module, the processor may generate feedback information including a result of channel measurement using the subsidiary carrier and transmit the feedback information to the base station through the transmission module.

Here, the feedback information may include interference information associated with interference between a plurality of cells in association with the channel measurement. In accordance with another aspect of the present invention to achieve the above objects, a base station in a heterogeneous network may include a transmission module for transmitting a radio signal, a reception module for receiving a radio signal, and a processor for determining a weight vector for forming a beam pattern to be applied to a subsidiary carrier that is transmitted through the transmission module, wherein the processor transmits carrier operation information including information associated with the determined weight vector to a user equipment using a primary carrier through the transmission module and transmits the subsidiary carrier to the user equipment after applying the determined weight vector to the subsidiary carrier through the transmission module.

In accordance with an embodiment of the present invention, the base station may determine the weight vector for forming the beam pattern to be applied to the subsidiary carrier when a carrier used by a macro cell, which is supported by the base station, overlaps with a carrier used by small cells included in the macro cell.

In accordance with an embodiment of the present invention, the processor may generate information associated with a weight vector set including one or more available weight vectors that can be applied to the subsidiary carrier, and transmit the generated information to the user equipment through the transmission module, and then determine a weight vector specific to the user equipment from the weight vector set based on feedback information received from the user equipment.

In accordance with an embodiment of the present invention, the processor method may adjust a region in which the subsidiary carrier is transmitted after being beamformed in a macro cell, whose service is supported by the base station, based on feedback information including interference information associated with interference between a plurality of cells in association with channel measurement, the feedback information being received from the user equipment through the reception module.

In accordance with an embodiment of the present invention, the processor may determine a weight vector for forming a beamforming to be applied to a reference signal, generate reference signal operation information including at least one of information associated with an order of beamforming to be applied to the reference signal and information associated with the number of antennas, and transmit the reference signal operation information to the user equipment through the transmission module.

In accordance with an embodiment of the present invention, the processor may generate information associated with subsidiary carrier transmission, the information including a weight vector for forming a beamforming to be applied to the subsidiary carrier and information associated with time/frequency resources to which a beamforming weight is applied, and transmit the information associated with the subsidiary carrier transmission to the user equipment through the transmission module and then perform carrier aggregation for the subsidiary carrier using feedback information associated with measurement of the subsidiary carrier that has been received from the user equipment through the reception module.

The above embodiments are just a part of a variety of preferred embodiments of the present invention and various other embodiments, to which the technical features of the present invention can be applied, may be derived and understood from the following detailed description of the present invention by a person having general knowledge in the art.

Advantageous Effects

According to the embodiments of the present invention, since the base station uses spatial silencing, the base station can control a carrier-specific region that can reduce the effects of interference applied to neighbor cells.

Advantages of the present invention are not limited to those described above and other advantages will be clearly understood by those skilled in the art from the following description.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

BEST MODE

The configuration, operation, and other features of the invention will be easily understood from the embodiments of the present invention upon which are described below with reference to the attached drawings. The embodiments of the present invention can be used for various wireless access technologies such as CDMA, FDMA, TDMA, OFDMA, SC-FDMA, and MC-FDMA. CDMA may be implemented as a wireless technology such as Universal Terrestrial Radio Access (UTRA) or CDMA2000. TDMA may be implemented as a wireless technology such as Global System for Mobile communications (GSM)/General Packet Radio Service (GPRS)/Enhanced Data Rates for GSM Evolution (EDGE). OFDMA may be implemented as a wireless technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). $3^{rd}$ Generation Partnership Project (3GPP) long term evolution (LTE) is a part of Evolved UMTS (E-UMTS) using E-UTRA, and LTE-Advanced (LTE-A) is an evolved version of 3GPP LTE.

Although the embodiments of the present invention will be described below mainly with reference to the case in which the technical features of the present invention are applied to a 3GPP system, this is purely exemplary and does not limit the present invention.

Although the present invention will be described based on LTE-A, proposed concepts or methods of the present invention and embodiments thereof are applicable to other systems (e.g. an IEEE 802.16m system), which use multiple carriers, without restriction.

Figure 1:
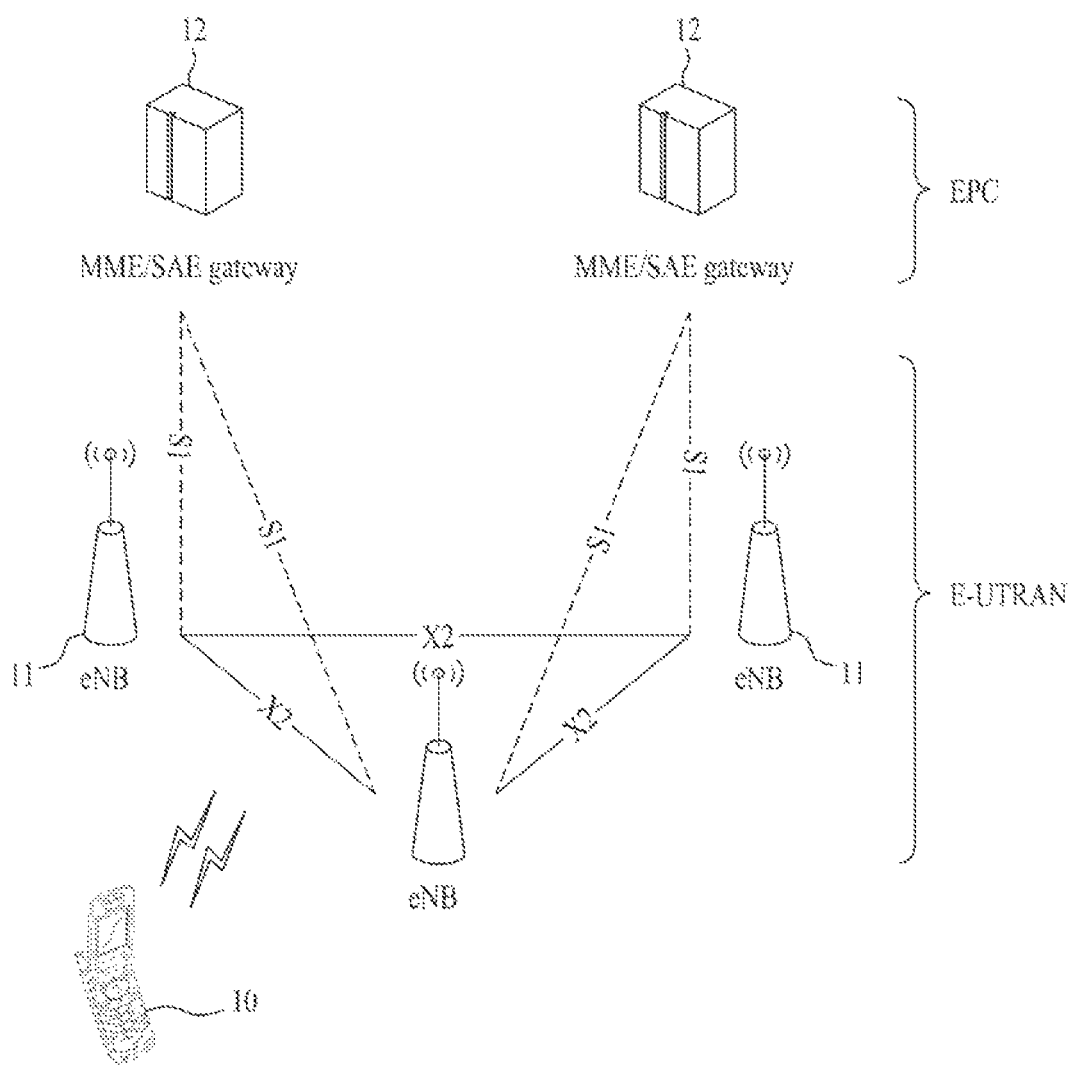
FIG. 1 illustrates a network structure of an E-UMTS.

FIG. 1 illustrates a network structure of an E-UMTS. The E-UMTS is also referred to as an LTE system. A communication network is widely deployed to provide various communication services such as audio and packet data services.

As shown in FIG. 1, the E-UMTS network includes an Evolved Universal Terrestrial Radio Access Network (E-UTRAN), an Evolved Packet Core (EPC), and User Equipments (UEs). The E-UTRAN may include one or more eNode Bs (eNBs) 11 and one or more UEs 10 may be located per cell. One or more Mobility Management Entity/System Architecture Evolution (MME/SAE) gateways 12 may be located at an end of the network and connected to an external network. In this specification, the term "downlink" refers to communication from the eNB 11 to the UE 10 and the term "uplink" refers to communication from the UE 10 to the eNB 11.

The UE 10 is a communication device carried by a user and the eNB 11 is generally a fixed station that communicates with the UE 10. The eNB 11 provides end points of a user plane and a control plane to the UE 10. One eNB 11 may be located in each cell. An interface for transmitting user traffic or control traffic may be used between the eNBs 11. Each MME/SAE gateway 12 provides end points of session and mobility management functions to the UE 10. The eNB 11 and the MME/SAE gateway 12 can be connected to each other through an S1 interface.

The MME provides various functions including distribution of paging messages to eNBs 11, security control, idle state mobility control, SAE bearer control, encryption of non-access stratum (NAS) layer signaling, and integrity protection. An SAE gateway host provides various functions including completion of a plane packet and user plane switching for supporting mobility of the UE 10. The MME/SAE gateway 12 will also be simply referred to as a gateway in this specification although it includes MME and SAE gateways.

Figure 2:
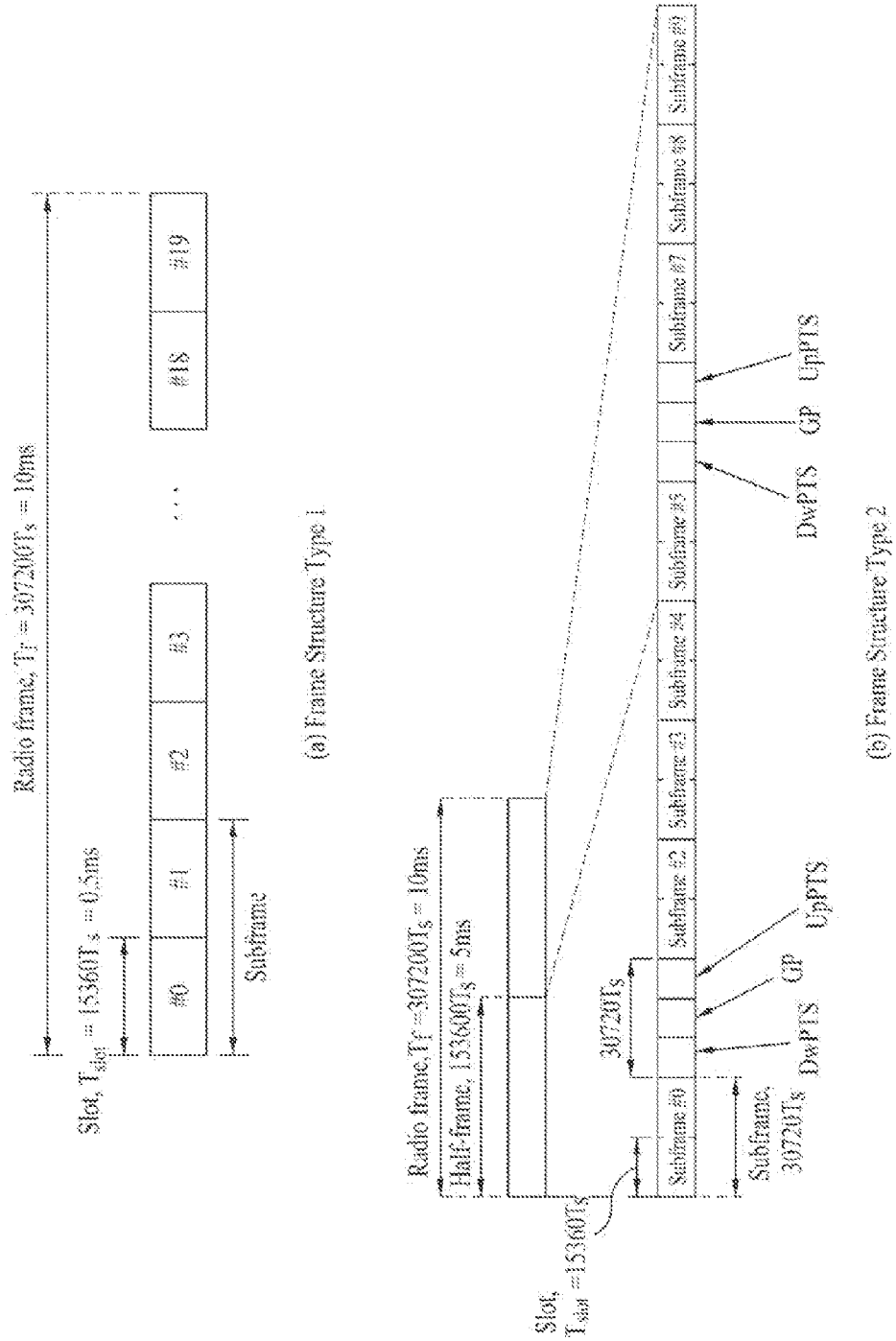
FIG. 2 illustrates a radio frame structure used in a Long Term Evolution (LTE) system.

A plurality of nodes may be connected between a gateway 12 and an eNB 11 through an S1 interface. The eNBs 11 may be connected to each other through an X2 interface and neighbor eNBs may have a meshed network structure having the X2 interface. FIG. 2 illustrates a radio frame structure used in the LTE system.

As shown in FIG. 2, a radio frame has a length of 10 ms ($327200 \times T_S$) and includes 10 subframes of the same size. Each subframe is 1 ms long and includes two 0.5 ms slots. $T_s$ represents a sampling time and is given as $T_s=1/(15 \text{ kHz} \times 2048)=3.2552 \times 10^{-8}$(about 33 ns). A slot includes a plurality of Orthogonal Frequency Division Multiplexing (OFDM) (or SC-FDMA) symbols in the time domain and includes a plurality of Resource Blocks (RBs) in the frequency domain. One Resource Block (RB) includes 12 subcarriers and 7 (6) OFDM (or SC-FDMA) symbols in the LTE system. Frame structure types 1 and 2 are used for FDD and TDD, respectively. A frame of the frame structure type 2 includes 2 half frames, each of which includes 5 subframes, a Downlink Piloting Time Slot (DwPTS), a Guard Period (GP), and an Uplink Piloting Time Slot (UpPTS). The radio frame structure is purely exemplary and thus the number/length of subframes, slots, or OFDM (or SC-FDMA) symbols may be varied.

Figure 3:
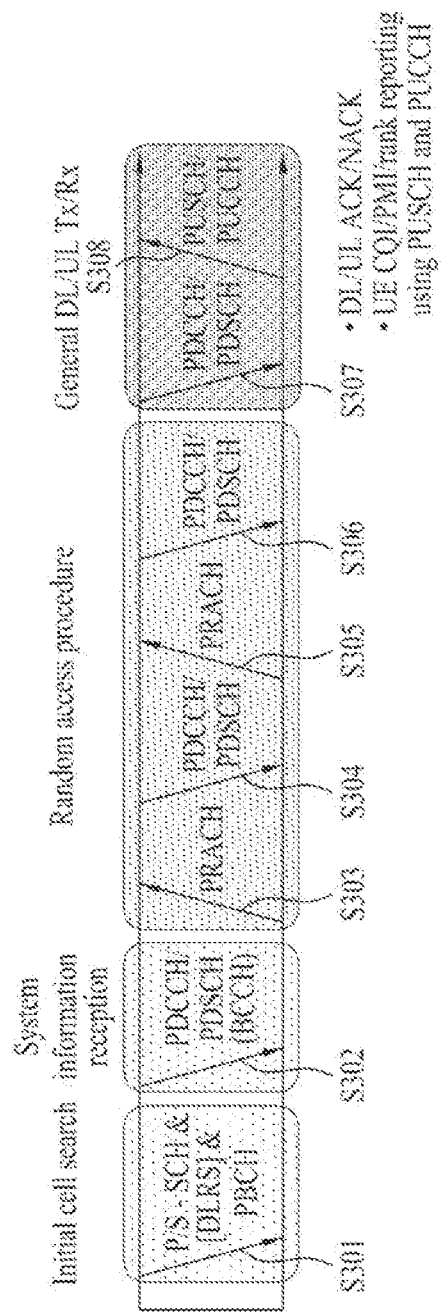
FIG. 3 illustrates physical channels used for an LTE system and signal transmission using the physical channels.

FIG. 3 illustrates physical channels used for a Long Term Evolution (LTE) system and signal transmission using the physical channels.

When a UE is powered on or enters a cell, the UE performs an initial cell search operation such as synchronization with a BS (S301). For the initial cell search operation, the UE may receive a Primary Synchronization Channel (P-SCH) and a Secondary Synchronization Channel (S-SCH) from the BS to achieve synchronization with the BS and acquire information such as a cell ID. Thereafter, the UE may receive a physical broadcast channel from the BS and acquire broadcast information in the cell. After completing the initial cell search, the UE may receive a Physical Downlink Control Channel (PDCCH) and receive a Physical Downlink Shared Channel (PDSCH) according to information carried in the PDCCH, thereby acquiring more detailed system information (S302).

In the case in which the UE initially accesses the BS or has no wireless resources for signal transmission, the UE may perform a random access procedure to access the BS using a Random Access Channel (RACH) (steps S303 to S306). For the random access procedure, the UE may transmit a specific sequence as a preamble through a Physical Random Access Channel (PRACH) (S303 and S305) and may receive a response message in response to the preamble through a PDCCH and a PDSCH corresponding to the PDCCH (S304 and S306). In the case of contention-based random access, the UE may additionally perform a contention resolution procedure.

After performing the procedure described above, the UE may receive a PDCCH/PDSCH (S307) and transmit a Physical Uplink Shared Channel (PUSCH)/Physical Uplink Control Channel (PUCCH) (S308) as a general uplink/downlink signal transmission procedure.

Control information that the UE transmits to the BS through uplink or receives from the BS through downlink includes an acknowledgement/negative-acknowledgement (ACK/NACK) signal, scheduling request (SR) information, a channel quality indicator (CQI), a precoding matrix indicator (PMI), a rank indicator (RI), etc. In the case of the 3GPP LTE system, the UE may transmit control information such as CQI/PMI/RI through a PUSCH and/or a PUCCH.

A heterogeneous network may be constructed and a number of small cells may be present in one cell. The following description will be given with reference to a macro cell and femto cells as an example.

Figure 4:
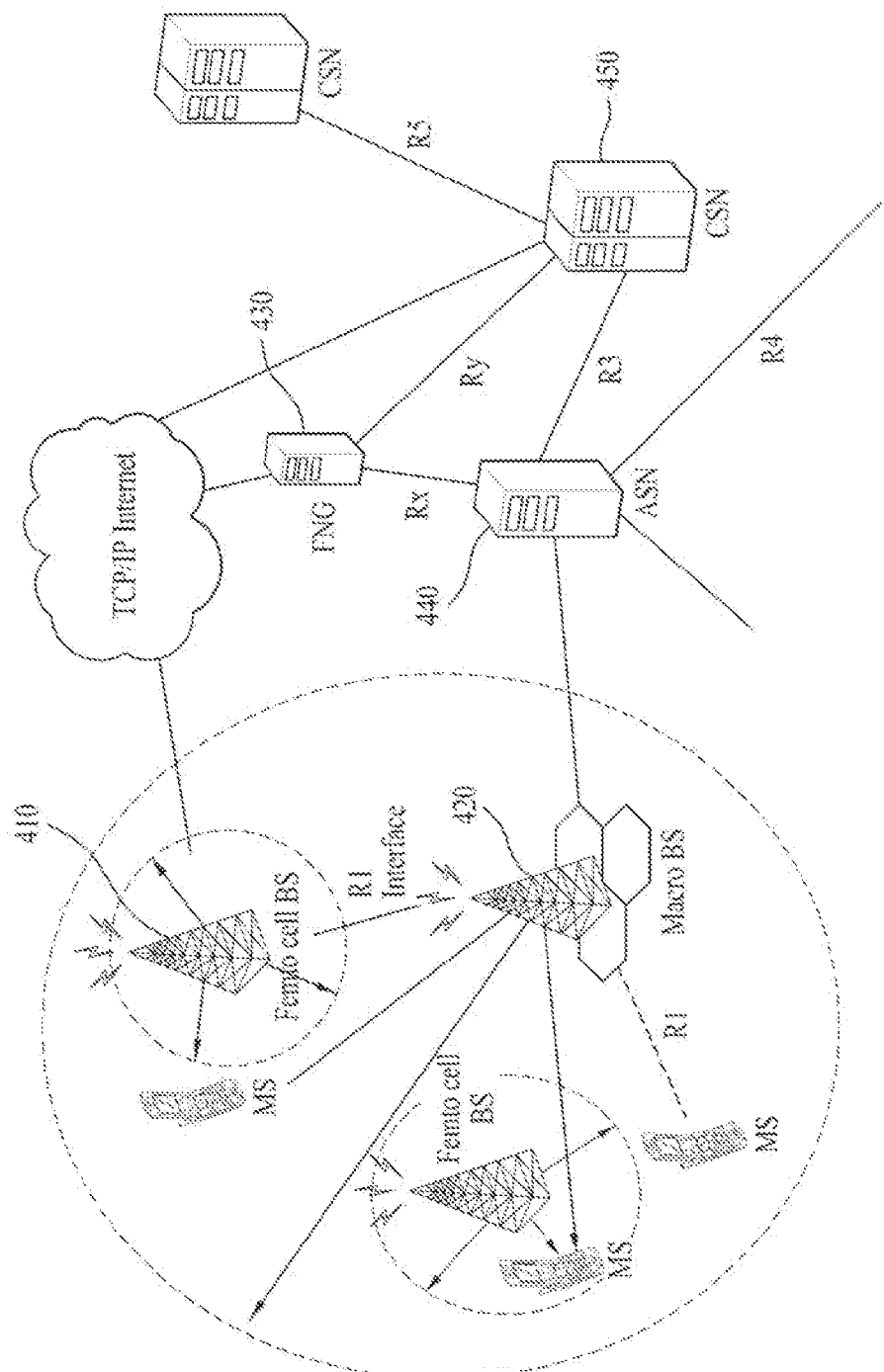
FIG. 4 illustrates a configuration of a wireless communication system to which femto cell BSs are added.

FIG. 4 illustrates a configuration of a wireless communication system to which femto cell BSs are added.

A heterogeneous network may be constructed and small cells such as femto cells, which are areas in which femto cell BSs support services, may be present in a macro cell area. Each of the femto cell BSs is a small version of the macro cell BS which supports services in the macro cell. Specifically, the femto cell BS is a type of BS which may perform most functions of the macro cell BS and may be installed in an area covered by the macro cell BS or in a blind zone which is not covered by the macro cell BS. The femto cell BS has an independently operating network configuration and a significantly larger number of femto cell BSs than relay BSs may be installed in downtown or indoor areas. Thus, a femto cell BS list is not included in a neighbor BS list that is transmitted from a BS to an MS since the amount of information of the femto cell BS list is too large.

As shown in FIG. 4, the wireless communication system to which femto cell BSs are added includes femto cell BSs 410, a macro BS 420, a femto network gateway (FNG) 430, an access service network (ASN) 440, and a connectivity service network (CSN) 450. The macro BS 420 is a general BS of a conventional wireless communication system.

As a small version of the macro BS 420, each of the femto cell BSs 410 performs most functions of the macro cell BS. The femto cell BS 410 directly accesses a transmission control protocol/Internet protocol (TCP/IP) network and operates independently, similar to the macro BS 420, and has a coverage of about 0.1 to 30 m. Each femto cell BS 410 can accommodate about 10 to 20 MSs. The femto cell BS 410 may use the same frequency as that of the macro BS 420 and may also use a different frequency.

The femto cell BS 410 is connected to the macro BS 420 through an R1 interface such that the femto cell BS 410 can receive a DL channel from the macro BS 420 and can transmit a control signal to the macro BS 420.

The femto cell BS 410 can cover an indoor or blind zone which cannot be covered by the macro BS 420 and can support high-speed data transmission. The femto cell BS 410 may be installed in a macro cell in an overlay manner and may also be installed in a region upon which is not covered by the macro BS 420 in a non-overlay manner.

A conventional heterogeneous network or MIMO system uses a carrier on/off scheme that controls a carrier transmitted from a macro cell in order to reduce interference between a macro cell and a small cell such as a femto cell located in the macro cell and to improve link quality of an MS that supports services.

In the case in which a macro cell uses the same carrier as that of a small cell such as a femto cell located in the macro cell, it is possible to turn off transmission of the carrier in order to reduce the effects of interference applied to the small cell. In this case, it is efficient for a small cell region to achieve high throughput for carriers corresponding to the carrier that has been turned off in the macro cell. In addition, if the carrier on/off scheme is applied to MSs located at edges of a small cell, it is possible to reduce the effects of interference caused not only by small neighbor cells but also by various sizes of cells such as an entire cell region.

On the other hand, a soft fractional frequency reuse scheme, in which power allocation related control is performed, may be used for carriers shared by multiple cells. For example, by reducing the level of transmission power in a cell which causes high interference effects upon other cells, it is possible to reduce the effects of interference between multiple cells which use the same carriers. In this case, a cell can use a carrier corresponding to the controlled interference level by efficiently reducing the cell size of shared carriers.

However, if the conventional carrier on/off scheme is used in a large cell area such as a macro cell including a number of MSs, a carrier on/off operation for a specific MS is also applied to other MSs, thereby reducing the effects associated with throughput efficiency. Specifically, if a turn-off operation is performed on a carrier shared by multiple cells, the carrier cannot be used for intra-cell MSs that are located within a cell.

In the heterogeneous network operation, each carrier may operate in a heterogeneous mode. Thus, in the case in which the carrier on/off scheme is used, there is a problem in that it is difficult to use various functions that can be performed by specific carriers, each of which may be used to perform a specific function.

The present invention suggests a signal transmission method which reduces the effects of interference between cells and also allows the same carrier to be used not only in a macro cell but also in small cells located in the macro cell.

Spatial silencing according to an embodiment of the present invention is a scheme for increasing throughput efficiency and reducing the effects of inter-cell interference through appropriate adjustment between multiple cells which use the same carriers in one cell.

To explain a signal transmission method according to embodiments of the present invention, it is assumed that beamforming is used for a channel shared in a cell area of a heterogeneous network or a MIMO system in the embodiments.

Figure 5:
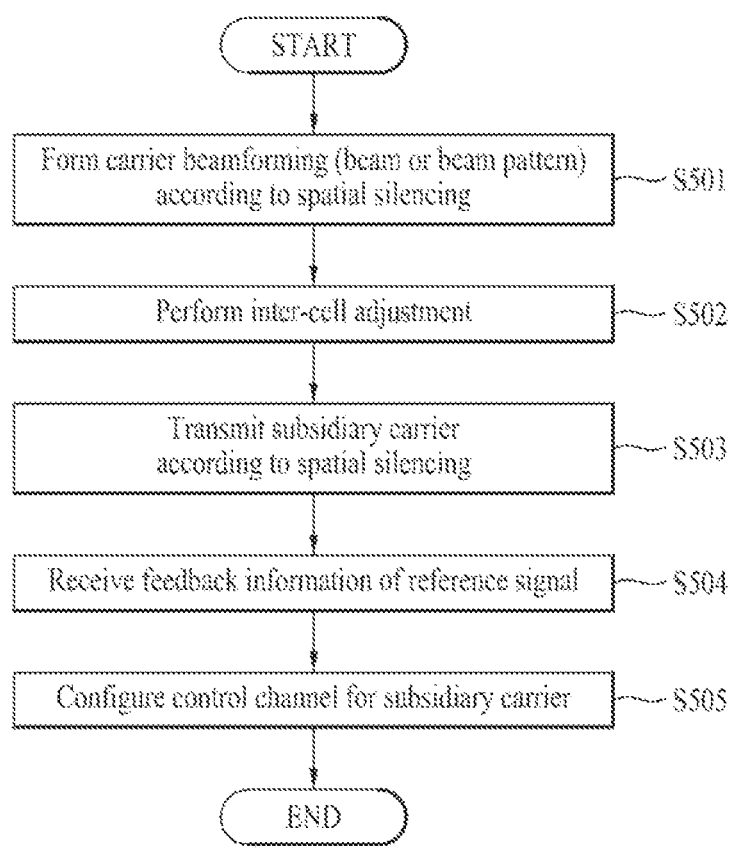
FIG. 5 is a flowchart illustrating an example of a signal transmission procedure for reducing inter-cell interference in a heterogeneous network system according to an embodiment of the present invention.

FIG. 5 is a flowchart illustrating an example of a signal transmission procedure for reducing inter-cell interference in a heterogeneous network system according to an embodiment of the present invention.

As shown in FIG. 5, a macro cell BS which supports a macro cell including a plurality of small cells such as femto cells may transmit a carrier using spatial silencing according to an embodiment of the present invention in order to reduce the effects of interference applied to small cells such as femto cells that share the same carrier within the macro cell. In an example of spatial silencing, beamforming may be used so as to transmit a signal of a carrier to an area other than the areas of the small cells and a beamforming operation mode to be used may be determined (S501). That is, in the case in which a BS of the macro cell uses the same carrier as in a small cell, it is possible to apply beamforming so as to transmit a carrier to a region other than the area of the small cell.

In the case in which the same carrier as used in multiple cells is transmitted, it is possible to use a beamforming operation scheme in which a subsidiary carrier is transmitted through beamforming in a specific or random pattern at intervals of a predetermined period according to methods described in sections 1) and 2) that will be described later. Here, the term "subsidiary carrier" refers to a carrier that serves to assist main traffic transmission and reception in a system and may be used interchangeably with the term "secondary carrier". The subsidiary carrier may be discriminated from a primary carrier by frequency division.

In the case in which a system band is divided into a plurality of subbands, it is possible to selectively and independently perform silencing (beamforming) using each subband. For example, in the case in which the divided subbands are applied on a carrier by carrier basis, a primary carrier may be transmitted through a primary subband and a subsidiary carrier may be transmitted through a secondary subband. In the case in which the system supports carrier aggregation, each subband corresponds to a component carrier.

In this specification, the terms "primary carrier" and "subsidiary carrier" may be replaced with other equivalent terms which are arbitrarily defined for better understanding of the present invention. For example, in the case in which the system supports a block of consecutive frequencies, similar to the LTE system, the primary carrier and the subsidiary carrier may correspond to subbands (for example, one or more consecutive/nonconsecutive subsidiary carriers), into which one frequency block is divided. In addition, in the case in which the system supports carrier aggregation, the primary carrier and the subsidiary carrier may be defined on a component carrier basis or may correspond to subbands into which one component carrier is divided.

After the BS has determined the beamforming operation scheme for the carrier, the BS may perform inter-cell adjustment for spatial silencing (S502). Inter-cell adjustment will be briefly described later in section 3).

After performing beamforming operation scheme determination and inter-cell adjustment, the BS may transmit a subsidiary carrier through a specific region of the entire frequency bandwidth (S503). Here, the specific region in the frequency bandwidth used to transmit the subsidiary carrier may be defined as a secondary band and may be discriminated from a primary band which is a region for transmitting the primary carrier. The beamforming band corresponds to the secondary band and the non-beamforming band corresponds to the primary band.

Thereafter, the BS may receive feedback information associated with channel information, which has been measured based on a Reference Signal (RS), from a User Equipment (UE) (or Mobile Station (MS)) (S504). Here, the BS may also apply beamforming to transmit the RS and may previously provide separate information to the UE to allow the UE to receive the beamformed RS. A procedure for the UE to receive and measure the RS will be briefly described later in sections 6) and 7).

Upon receiving the feedback information from the UE, the BS may perform control and data channel scheduling upon channels for transmitting subsidiary carriers (S505). This procedure will be briefly described later section 8).

The following are brief descriptions of operations of the BS or UE which correspond to the steps of the signal transmission procedure according to the embodiment of the present invention described above.

1) Carrier Beamforming

According to an embodiment of the present invention, when carrier transmission is performed, the beamforming scheme may be applied only to carriers other than primary carriers (i.e., only to subsidiary carriers). For example, one beam or multiple beams may be formed for all channels that are transmitted through subsidiary carriers to minimize the effects of signal interference applied to a neighbor cell.

Figure 6:
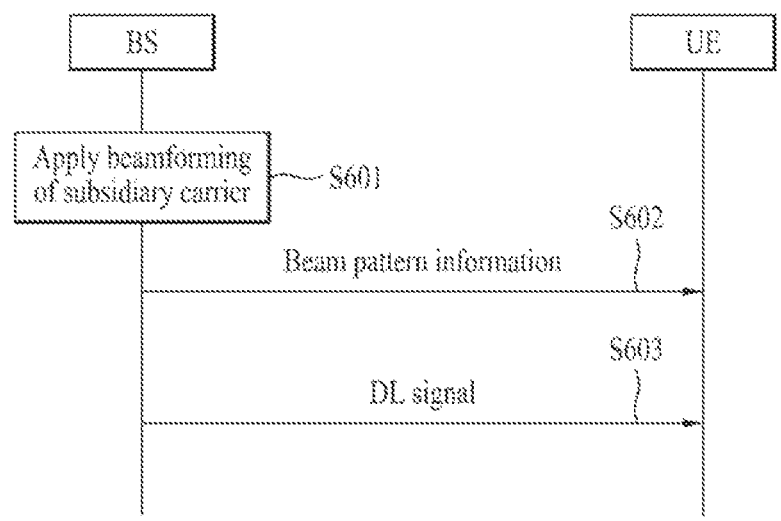
FIG. 6 illustrates an example of a signal transmission procedure according to an embodiment of the present invention.

FIG. 6 illustrates an example of a signal transmission procedure according to an embodiment of the present invention.

As shown in FIG. 6, the BS may determine one of a variety of beamforming operation schemes for subsidiary carriers (S601). In one beamforming operation scheme, different beamforming priorities may be defined according to the type of a channel transmitted through subsidiary carriers.

For example, when there is a need to discriminate transmission channel characteristics in association with reception of channel measurement/Quality of Service (QoS)/traffic or control information, it is possible to apply different weight vectors corresponding to different beamforming priority levels to multiple transmission antennas, which transmit transmission channels, according to the degree of importance of the QoS, traffic, or control information. In another example, when there is no need to discriminate channels in terms of the characteristics of the channels, it is possible to apply single/multiple weight vectors for adjusting beam patterns of the multiple transmission antennas, which transmit signals through subsidiary carriers, to be equal.

Here, if a beamforming operation scheme is determined in such a manner that an independent weight vector is determined for each transmission antenna by discriminating each channel, the BS may notify a plurality of UEs of information associated with the weight vector applied to each antenna, the information including beam pattern information of each UE or each UE group (S602). The information associated with the weight vector applied to each antenna may include, as beam pattern information, information associated with a vector which is representative of a weight group among various distinguished (or different) weights or information associated with an identification (indication or discriminating) vector or unit of each of weight vectors which can be identified (or discriminated) by the UE.

Upon receiving beam pattern information, each UE may receive a DL signal, which is transmitted through various transmission channels, based on the beam pattern information (S603).

According to an embodiment of the present invention, the BS may adjust the beamforming pattern such that a subsidiary carrier to which beamforming has been applied can be transmitted over an overall cell region.

2) Random Beamforming or Periodic Beam Forming

If a beam pattern of a subsidiary carrier is formed according to the embodiment of the present invention, the direction of the beam pattern may not cover an entire cell region. In this case, it is possible to set a plurality of weight vectors which can cover all areas, in which signal transmission is required, in one cell. However, this reduces efficiency when the number of transmission antennas is insufficient. That is, when the number of transmission antennas is insufficient, the shape of the beam pattern is too broad such that it may cause undesired interference upon other cells. To avoid this problem, there is a need to configure multiple beams. To accomplish this, it is necessary to provide a very large number of antennas or to form beams which are discriminated on time/frequency/code resources.

Therefore, in the case of a BS having a small number of antennas, it is possible to generate beams at time intervals such that each beam can cover a specific service region. Here, it is possible to partially use multiple beams depending on time/frequency rather than to simultaneously use multiple beams. For example, according to an embodiment of the present invention, it is possible to change the direction of a beam pattern of a subsidiary carrier according to a preset rule, for example, according to a rule associated with beam rotation or beam indication. Multiple beam application can use beamforming according to a Time Domain Division (TDD) scheme or a Frequency Domain Division (FDD) scheme, the transmitting side can change the direction of the beam every specific time unit (for example, every subframe). In the TDD scheme, the BS may configure a beam pattern such that a beam is transmitted to a different area in the cell in each time interval or such that a beam is not transmitted to regions of small cells which are present in the macro cell. Alternatively, when the FDD scheme is used, the direction of the beam pattern transmitted by the BS may vary depending on a frequency subset (for example, a subband beamforming (beam or beam pattern)).

In the case in which multiple cells use the same carrier, a specific beam pattern, which is defined on a macro cell basis, may be changed or rotated with a specific period in order to reduce the effects of interference between multiple cells. For example, in a reference macro cell, it is possible to determine the direction of the beam by applying independent offsets to other macro cells that use the same carrier while sequentially rotating the direction of the beam. In another example, a beam direction may be selected for each cell according to a specific pattern (for example, at intervals of a specific period, for example, 10 ms).

In the case in which a BS changes the direction of a beam while performing beamforming when transmitting a carrier, the BS may transmit information associated with the beam pattern to a UE.

The BS may use such beam control for the purpose of receiving channel measurement information from the UE at intervals of a specific period. That is, the BS may perform beam rotation and/or control as described above at the time when there is a need to receive information associated with channel measurement from the UE, rather than always performing beam rotation and/or control, and may perform, at other times, such an operation for specific UEs by applying beams specialized for the specific UEs in order to provide services to the specific UEs.

Figure 7:
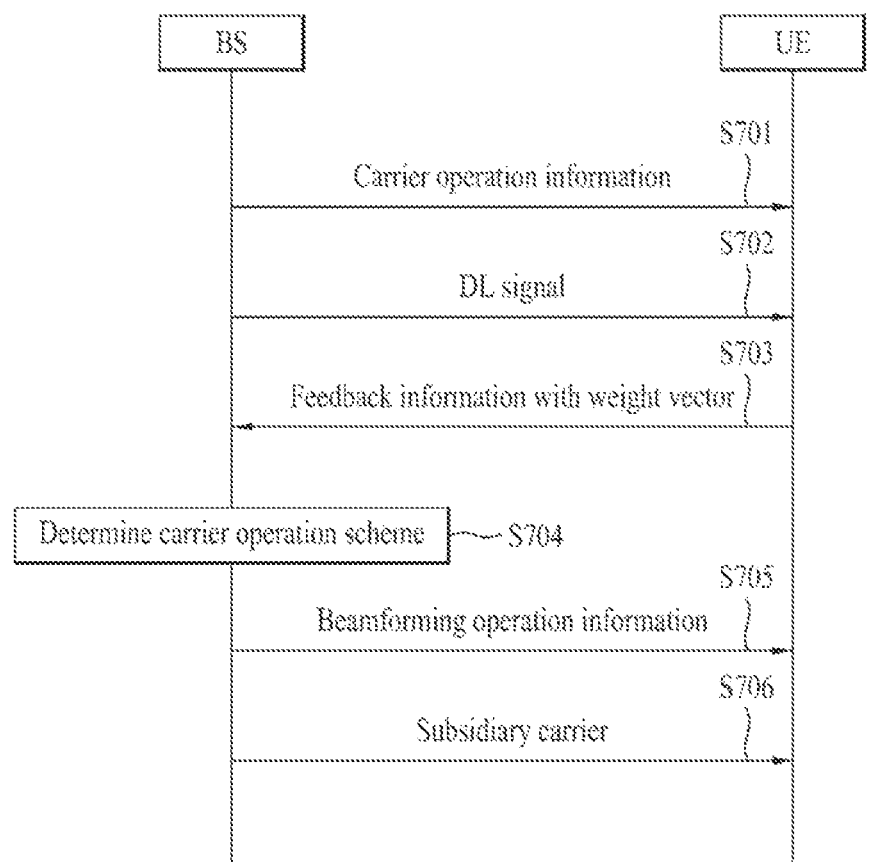
FIG. 7 illustrates another example of a signal transmission procedure according to an embodiment of the present invention.

FIG. 7 illustrates another example of a signal transmission procedure according to an embodiment of the present invention.

As shown in FIG. 7, the BS broadcasts carrier operation information, which includes information associated with a weight vector set including one or more weight vectors that can be applied respectively to transmission antennas, to a plurality of UEs (S701). Unlike this process, carrier operation information including weight vector set information may be preset in the BS and/or the UE.

Before determining a beamforming scheme to be used for a subsidiary carrier, the BS may broadcast carrier operation information including information associated with a weight vector set that can be used for beamforming, using a higher layer or L1/L2 signaling through a primary carrier that can arrive at all areas in the cell region. By receiving feedback information to the broadcast carrier operation information, the BS may determine how to implement beamforming for a subsidiary carrier.

Upon receiving the carrier operation information, each UE may receive DL signals, which are transmitted through a variety of respective transmission channels, based on beam pattern information included in the carrier operation information (S702).

The UE may measure a channel state based on a carrier transmitted using a respective weight vector and then may transmit feedback information associated with a result of the measurement to the BS (S703). The feedback information may include not only Channel Quality Information (CQI) and a Precoding Matrix Index (PMI) but also a weight vector which satisfies the optimal reception state of the UE, information associated with the weight vector that can be read by the UE, time information such as a subframe/frame which can be used to derive the weight vector, information associated with a frequency band, information associated with used resources, or the like.

Upon receiving the feedback information, the BS may determine a carrier operation scheme by determining specific weight vector information for the UE from the weight vector set based on feedback information (S704). Specifically, the BS may determine a beam pattern appropriate for transmitting a signal to the UE based on the feedback information and determine a scheme in which a beam pattern is to be used for the UE. That is, the BS may determine a weight vector for transmitting a beam pattern to a region in which the UE is located in the cell.

The BS may then transmit beamforming operation information determined for the UE to the UE through unicast (S705) and transmit a subsidiary carrier using the determined beamforming scheme (S706).

That is, according to an embodiment of the present invention, the BS may broadcast the same carrier operation information to all UEs located in the cell through a primary carrier while the BS may transmit different beam pattern information to each UE after receiving feedback information. The beam pattern information may vary depending on the service area and/or the position of the UE.

Here, the UE may obtain the feedback information to be transmitted to the BS through measurement at a subsidiary carrier upon the assumption of random (semi-random) beamforming. The UE may perform measurement of the specific beam according to beamforming configuration information (including information associated with time/frequency subband/beam weight vector information) indicated by the BS. As a measurement result of the specific beam, the UE may simply report, to the BS, information indicating whether or not the configuration of the beam is suitable for the UE through an indicator including one bit or an on/off scheme. In this case, the BS may select partial cell coverage information and statistical information for efficiently using a beamforming weight that can often be used using such on/off information.

3) Communication between Cells or BSs for Subsidiary Carrier Operation

According to an embodiment of the present invention, the BS needs to perform cell adjustment (or adjustment of a service area that is reached by beamforming) for minimizing the effects of inter-cell interference while performing beamforming of a subsidiary carrier. Before a service area that is reached by beamforming (or an equivalently defined weight vector for beamforming) is defined to perform such cell adjustment, interference information needs to be shared between cells that participate in communication.

In the case of a small cell, there is a need to acquire interference information from a neighbor cell for a subsidiary carrier or a primary carrier although beamforming of a subsidiary carrier may be used or may not be used. When a UE has performed measurement of beam direction and/or interference using a carrier, the UE may report a channel measurement result or PMI information to the serving cell. Alternatively, the BS of the serving cell may internally perform channel measurement of a UL signal transmitted from the UE to acquire inter-cell interference information. Channel measurement may be performed based on a cell-specific Reference Signal (RS) transmitted through every subframe without separate precoding or may be performed based on a precoded RS.

On the other hand, in the case in which a subsidiary carrier is used for interference measurement, it is possible to select one beam set from among beam sets which can be defined as a frequency band or a subframe according to beamforming configuration information (period, subband, weight vector, or the like) that is specified by the BS based on channel measurement information.

Among channel measurement information items, non-acceptable beamforming needs to be reported to the corresponding transmitting cell. Here, in the case in which a plurality of channel measurements is reported, there is also a need to simultaneously report information associated with corresponding measurement setting such as radio frame information, subframe information, or subband information.

4) Subsidiary Carrier Setting

According to another embodiment of the present invention, in the case in which a macro cell and small cells use the same carrier, it is possible to configure a subsidiary carrier using a cell or cell group-specific carrier or a network-wise-specific carrier without using the spatial silencing scheme. Accordingly, the UE need not perform channel measurement for subsidiary carriers other than a subsidiary carrier specified for the UE when performing handover or initial cell access.

In a heterogeneous network system, a number of small cells which can use system-wise available carriers are present in a macro cell. However, a carrier transmitted by a small cell may be affected by the position of the small cell or an operation scheme of the macro cell. Therefore, setting of a subsidiary carrier (or subsidiary carriers) shared by cells may be performed through negotiation between related cells such as a neighbor macro cell and small cells. After subsidiary carrier negotiation, small cells may report interference or channel quality and/or channel information of the shared subsidiary carrier to the macro cell and the macro cell may then implement beamforming which can minimize the effects of interference upon receiving the reported information.

5) Segmented Operation

The LTE-A system can support carriers which constitute an LTE band or an LTE-A band. Therefore, the LTE band can be used in a legacy mode and a legacy-compatible mode and the LTE-A band can be used for additional LTE-A optimization. Such a broadcast type may be discriminated in the time-frequency domain as shown in FIG. 8.

Figure 8:
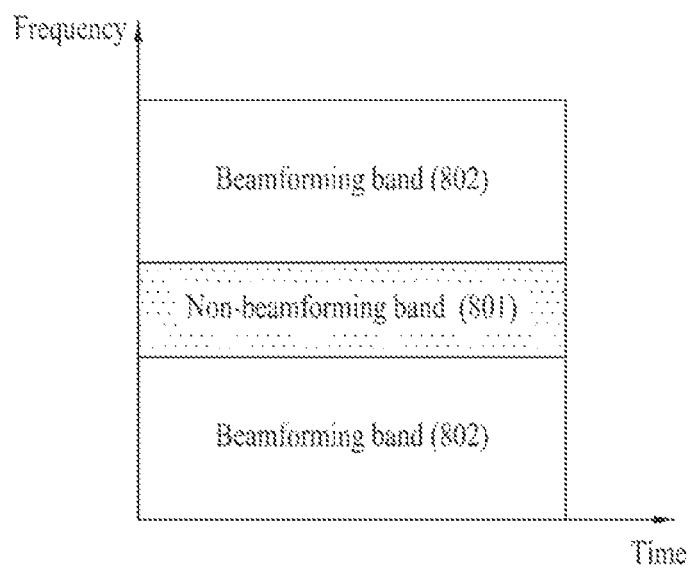
FIG. 8 illustrates a time-frequency resource region for carrier transmission according to an embodiment of the present invention.

FIG. 8 illustrates a time-frequency resource region for carrier transmission according to an embodiment of the present invention.

As shown in FIG. 8, a specific region in the frequency domain is a non-beamforming band or subband 801 used to transmit signals to all UEs and can be used to transmit a primary carrier. The non-beamforming band 801 can be discriminated from a beamforming band or primary band 802 which is a subband that can be used to transmit a beamformed subsidiary carrier to a specific UE according to an embodiment of the present invention.

In this structure, spatial silencing according to an embodiment of the present invention may be defined differently from conventional carrier silencing. For example, conventional carrier silencing is limited to a partial subband of the LTE-A band or a partial band of the LTE band such that a carrier transmission on/off scheme is used in a limited band. This allows small cells to use a silenced subband as a carrier when the small cells operate. That is, the center of a generated carrier is not allocated to the center of a macro cell carrier. However, small cells can achieve a low interference level without being affected by interference in the silenced subband from cooperative neighbor cells.

It is possible to more flexibly set the silencing subband. A partial or entire bandwidth may be spatially silenced while a non-silenced subband is still used for serving UEs in the entire cell region. The silenced subband may also subside operations of the non-silenced subband.

In the case in which spatial silencing according to an embodiment of the present invention is used, the beamforming weight vector may be supported only for a target subband which has been silenced. The beamforming weight vector may be changed in the time domain or the frequency domain as shown in FIG. 8. In the case of subband spatial silencing, both LTE subbands and LTE-A subbands (or other types of subbands) may be used for silenced subbands. In the case in which a control channel is silenced, a new operation may be defined for a non-silenced subband. For example, while grant information for the downlink or the uplink may be transmitted through a specific subband, the subband may be silenced in a specific environment. Then, the control channel of grant information transmission may be shifted to another subband that has not been silenced. This indicates that an additional control channel may be defined as a control channel for spatial silencing that can be used for management of a spatially silenced subband (for example, silencing on/off, weight vector change information, grant information of a silenced subband, and the like).

6) Subsidiary Channel Measurement using Reference Signal

A variety of channel measurement methods may be used in association with spatial silencing according to an embodiment of the present invention. When both silencing and non-silencing subbands/subframes are not included in carriers received by a UE, especially, when non-silencing measurement is not possible, it is possible to perform channel measurement directly from a subsidiary carrier to which silencing has been applied. When channel measurement has been performed based on a known symbol such as a preamble or a Reference Signal (RS), a corresponding channel including the known symbol may be present and may be shared by a plurality of small cells and a macro cell. The known symbol may be previously shared between BSs. Alternatively, the UE may receive information transmitted by an arbitrary BS in multiple manners (i.e., may search multiple cells and receive information from the cells or connect to the cells) and may then transmit measurement information of the symbols through the serving cell or through a UE-specific serving cell.

According to the spatial silencing method according to an embodiment of the present invention, in the case in which beamforming is also performed on an RS, it is possible to prevent a plurality of UEs present in a region, in which a beamforming (a beam or a beam pattern) is transmitted, from measuring a subsidiary carrier that has undergone path loss. This is because the accuracy of path loss measured according to the shape of the beam is reduced when the path loss has occurred in a subsidiary carrier that has been transmitted through beamforming. Accordingly, a BS according to an embodiment of the present invention may notify UEs of information associated with the order (or sequence) of beamforming or the number of antennas used for subsidiary carrier transmission in order to accurately measure a subsidiary carrier that has undergone path loss.

Upon receiving such information, each UE may perform measurement of an appropriate subsidiary carrier. For example, in the case in which a cell common reference signal (CRS) is used for channel measurement and a CRS that a small cell transmits without beamforming causes a high level of interference upon a neighbor cell, the BS may also perform beamforming on the CRS. That is, the BS according to the embodiment of the present invention may define beamforming for the CRS in order to prevent interference caused by the CRS.

Here, a UE which has received beamforming information may perform channel measurement according to each beamformed weight vector or may perform channel measurement based on a unit such as a subframe or a subband. However, a UE may be absent in a sub-cell region in which beamforming is performed and thus it is preferable that a variety of weight vectors be applied to the CRS according to the subframe or frequency subband. In this case, the UE may convert a measurement value of the CRS into a value based on a corresponding subframe index or frequency band and then may report the converted value as a subframe index or frequency band corresponding to or independent of the measurement value of the CRS to the BS. This allows the BS to determine how to apply a beamforming weight vector in order to change a cell region, in which a carrier for providing a service to the UE is transmitted, according to a predetermined rule. In the case in which a UE measures a subsidiary carrier, similar to a specified RS, the BS may change a beamforming weight vector according to the subframe or frequency subband.

In the case in which path loss has occurred when a subsidiary carrier is transmitted, the accuracy of the measured path loss may be reduced. However, if the order of beamforming is not sufficiently high, the magnitude of the beam gain is not important, after the magnitude of a general path loss measurement error is sufficiently increased to about the magnitude of the beam gain, and can be ignored when the path loss has been calculated.

7) Carrier Aggregation from the Viewpoint of Spatial Silencing

When a subsidiary carrier is used as an additional traffic carrier for a single UE, the subsidiary carrier may be represented as a UE-specific carrier for DL reception. However, since the subsidiary carrier may be managed in a non-hearing state since, through the subsidiary carrier, it is not possible to estimate a beamforming weight appropriate for a signal that is directly transmitted to the UE.

Therefore, although the subsidiary carrier is handled as a general carrier and the BS can control a UE operation based on a carrier aggregation, it is more efficient to define another operation scheme based on the operation of the subsidiary carrier. For example, when a UE has previously determined an appropriate beam weight through channel measurement and the BS switches beam weights for controlling carrier transmission regions, the UE does not receive a subsidiary carrier when a UE-specific beamforming weight is not applied or receives a subsidiary carrier when a UE-specific beamforming weight is applied.

To accomplish such an operation, the BS needs to transmit information associated with subsidiary carrier transmission, such as a beamforming weight and a time/frequency subband of the beamforming weight, through system information or UE-specific radio resource control (RRC) signaling. The information associated with subsidiary carrier transmission information may be transmitted together with the beam pattern information in step S602 of FIG. 6 or may be transmitted together with the beamforming operation information in step S705 of FIG. 7. The information associated with subsidiary carrier transmission information may include at least one of a bandwidth for transmitting the subsidiary carrier, beamforming pattern information such as the size of each subband and/or the period of rotation of the weight vector, weight matrix information, antenna configuration information, and a method of measuring a received signal of the subsidiary carrier.

Thereafter, the BS may determine a carrier aggregation based on feedback measurement information transmitted from the UE. When the UE can detect the subsidiary carrier at a sufficiently high level of signal strength, the subsidiary carrier may be aggregated with the primary carrier. Otherwise, the subsidiary carrier is not allocated to the UE since the UE may be absent in the corresponding subsidiary carrier transmission region.

8) Use of Control and Data Channels through Subsidiary Channel

The BS may adjust a control channel based on feedback information transmitted from the UE.

Generally, there is a need to add an additional signaling procedure for allowing the UE to receive a subsidiary carrier since it is not guaranteed that the UE decodes a control channel from every control channel.

To accomplish this, according to an embodiment of the present invention, information associated with a method of decoding the time or frequency of a subband is transmitted to the UE. When the UE has received the information associated with the decoding method, the UE may receive and decode a subframe that has been transmitted after being beamformed in a direction toward a position at which the UE is located. However, the decoding setting method cannot be actively changed since the time or frequency decoding setting of the subband can be defined using higher layer signaling through a primary carrier (or a carrier of the entire region).

Accordingly, in a method of transmitting a signal using a spatial silencing according to an embodiment of the present invention, the BS may perform the step of transmitting information associated with the decoding method after the beam pattern information transmission step of FIG. 6 or the carrier operation information transmission step of FIG. 7 in order to allow dynamic scheduling associated with decoding setting in an arbitrary subframe. Scheduling information associated with a control channel used to transmit a subsidiary carrier may be transmitted through a primary carrier. The scheduling information may merely include indication information, which indicates whether or not scheduling of the subsidiary carrier is performed, or grant information of the subsidiary carrier.

Here, when the scheduling information includes only the indication information upon which indicates whether or not scheduling of the subsidiary carrier is performed, the UE needs to decode grant information from the subsidiary carrier. Here, the complexity of decoding may be reduced through indication information including a variety of parameters associated with decoding position such as a transmission mode, an antenna configuration, an aggregation level, a search space index, and a frequency subband.

One or more parameters included in the indication information may be predefined through higher layer scheduling or L1/L2 control scheduling. In the case in which the grant information is directly transmitted through a primary carrier, the grant information may include a carrier identification (ID) of the subsidiary carrier. The carrier ID may be defined based on a subsidiary carrier that can be used for each UE or all available carriers.

As described above, it is also possible to use a method of turning a stream on/off in a space domain (for example, a unique beamforming region) of an uncorrelated environment which is not a physical space such as a cell region upon which uses beamforming, unlike the embodiment of the present invention.

A spatial silencing method according to another embodiment of the present invention uses a transmission on/off scheme in the space domain, specifically uses a layer on/off scheme.

The BS may use the transmission on/off scheme in the space domain in order to reduce interference between macro cells. In one exemplary method of transmitting information associated with this spatial silencing method, information associated with whether a layer is turned on/off may be transmitted to the UE through RRC scheduling (for example, in the form of a bitmap). For example, in the case in which 12 physical antennas are located in one macro cell, 3 space domains may be configured using 12 physical antennas. That is, it is possible to determine whether or not a signal is transmitted to a specific region in a cell through a transmission on/off scheme for each space domain. Here, it is possible to indicate whether signal transmission is turned on/off in each space domain of one cell through a 3-bit bitmap.

Here, it is possible to employ an on/off method for space domains in which a space domain, for which an on/off operation is performed, is arbitrarily selected using a pseudo random pattern.

A BS and a UE through which the embodiments of the present invention can be implemented are described below with reference to FIG. 9.

Figure 9:
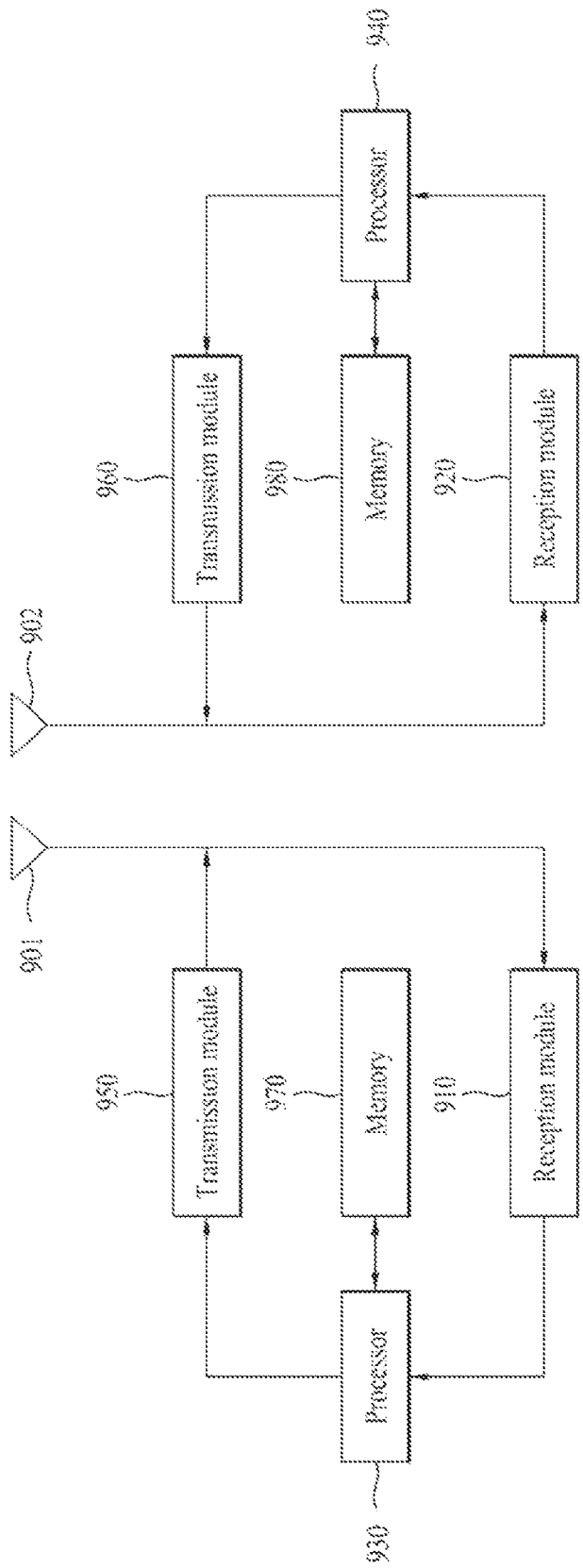
FIG. 9 is a block diagram of a BS and a UE through which the embodiments of the present invention can be implemented.

FIG. 9 is a block diagram of a BS and a UE through which the embodiments of the present invention can be implemented.

The UE may operate as a transmission device in uplink and may operate as a reception device in downlink. The BS may operate as a reception device in uplink and may operate as a transmission device in downlink. That is, each of the UE and the BS may include a transmission device and reception device for transmitting and receiving information or data.

The transmission device and the reception device may include processors, modules, portions, and/or means for implementing the embodiments of the present invention. Specifically, each of the transmission device and the reception device may include a module (means) for encrypting a message, a module for analyzing an encrypted message, an antenna for transmitting and receiving a message, and the like.

The left side of FIG. 9 shows a structure of a transmission device of a BS and the right side shows a structure of a reception device of a UE which has entered a cell which is serviced by the BS. The transmission device and the reception device may include antennas 901 and 902, reception modules 910 and 920, processors 930 and 940, transmission modules 950 and 960, and memories 970 and 980.

The antennas 901 and 902 include reception antennas that serve to receive radio signals from the outside and deliver the received signal to the reception modules 910 and 920 and transmission antennas that serve to transmit signals generated by the transmission modules 950 and 960 to the outside. Two or more antennas 901 and 902 may be provided when a multiple antenna (MIMO) function is supported.

The reception modules 910 and 920 may perform decoding and demodulation of a radio signal received from the outside through the antennas to restore the signal into original data and may deliver the original data to the processors 930 and 940. The reception module and the antenna may also be implemented as an integrated reception unit for receiving radio signals rather than being implemented as separate modules as shown in FIG. 9.

The processors 930 and 940 generally control overall operations of the transmission device or the reception device. Specifically, the processors 930 and 940 may perform a controller function for performing the embodiments of the present invention described above, a function to perform Medium Access Control (MAC) frame variable control according to service characteristics and radio environments, a handover function, an authentication and encryption function, and the like.

The transmission modules 950 and 960 may perform predetermined coding and modulation on data, which the processors 930 and 940 have scheduled to be transmitted to the outside, and then may deliver the resulting data to the antennas. The transmission module and the antenna may also be implemented as an integrated transmission unit for transmitting radio signals rather than being implemented as separate modules as shown in FIG. 9.

The memories 970 and 980 may store programs for processing and control by the processors 930 and 940 and may also temporarily store input/output data items. In the case of the UE, the temporarily stored input/output data items include a UL grant, system information, a station identifier (STID), a flow identifier (FID), an operation time, and the like.

The memories 970 and 980 may include a storage medium of at least one of a flash memory type, a hard disk type, a multimedia card micro type, a card type (for example, SD or XD memory), Random Access Memory (RAM) Static Random Access Memory (SRAM), Read-Only Memory (ROM), Electrically Erasable Programmable Read-Only Memory (EEPROM), Programmable Read-Only Memory (PROM), a magnetic memory, a magnetic disc, and an optical disc.

The processor 930 of the transmission device may perform an overall control operation of the BS and may perform a control operation to transmit a subsidiary carrier using spatial silencing in a macro cell region, whose service is supported by the BS, according to the embodiment of the present invention described above with reference to FIG. 5. For example, it is possible to use a method in which the direction of a beam is changed or rotated according to a predetermined rule while performing beamforming for a subsidiary carrier as in the above embodiment.

To accomplish this, if information associated with a weight vector set that can be used in the transmission device is transmitted to the reception device through the transmission module 950, the processor 940 of the reception device may transmit a channel measurement result associated with each weight vector as feedback information to the transmission device. That is, the processor 930 of the transmission device may determine a weight vector to be used when transmitting a carrier for the reception device based on the received feedback information and may perform beamforming using the determined weight vector.

In this procedure, the processor 930 of the transmission device may perform not only the embodiments of FIG. 6 or FIG. 8 described above but also the procedures of steps 1) and 8) described above.

The processor 940 of the reception device may perform an overall control operation of the UE. According to the embodiments of the present invention described above, the processor 940 may receive carrier operation information (information associated with a beamforming based scheme) using information associated with spatial silencing transmitted from the transmission device through the transmission module 920 and may use the received information to receive a carrier.

The processors 930 and 940 may be configured to transmit each control information item described above in the embodiments of the present invention through separate (or additional) scheduling rather than using a DM-RS. The BS may also perform, through at least one of the modules described above, a control function to implement the embodiments of the present invention, orthogonal frequency division multiple access (OFDMA) packet scheduling, time division duplex (TDD) packet scheduling and channel multiplexing functions, a function to perform MAC frame variable control according to service characteristics and radio environments, a high-speed traffic real-time control function, a handover function, an authentication and encryption function, a packet modulation/demodulation function for data transmission, a high-speed packet channel coding function, a real-time modem control function, etc. Alternatively, the BS may further include a separate means, a module, or a part for performing such functions.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may combine the structures described in the above embodiments in a variety of ways.

Accordingly, the invention should not be limited to the specific embodiments described herein, but should be accorded the broadest scope consistent with the principles and novel features disclosed herein.

INDUSTRIAL APPLICABILITY

The embodiments of the present invention may be applied to a variety of wireless access systems. For example, the embodiments of the present invention may be applied not only to a 3rd Generation Partnership Project (3GPP) system, a 3GPP2 system, and/or an Institute of Electrical and Electronic Engineers (IEEE) 802.xx system but also to a variety of technical fields to which the variety of wireless access systems are applicable.

The invention claimed is:

1. A method for a base station to transmit a signal in a heterogeneous network, the method comprising:
   transmitting, to a plurality of user equipment, information associated with a weight vector set, the weight vector set including one or more weight vectors that can be applied to reference signals carried by a subsidiary carrier through downlink control signals carried by a primary carrier;
   transmitting, to the plurality of user equipment, the reference signals to which each of the one or more weight vectors included in the weight vector set has been applied;
   receiving, from the plurality of user equipment, feedback information associated with channel measurement results for the reference signals;
   determining weight vector information applied to a downlink signal carried by the subsidiary carrier, the weight vector information determined based on the feedback information, wherein the weight vector information is specific to each user equipment of the plurality of user equipment;
   transmitting, to each user equipment of the plurality of user equipment, the determined weight information; and
   transmitting, to each user equipment of the plurality of user equipment, the downlink signal carried by the subsidiary carrier using the determined weight vector information.

2. The method according to claim 1, wherein the subsidiary carrier and the primary carrier are transmitted through different frequency segments from among a plurality of frequency segments that comprise an available system band.

3. The method according to claim 1, wherein the determining the weight vector is selectively performed when a carrier used by a macro cell that is supported by the base station overlaps with a carrier used by cells included in the macro cell.

4. The method according to claim 1, further comprising:
receiving, from each user equipment of the plurality of user equipment, feedback information including interference information related to interference between a plurality of cells in association with a channel measurement; and
adjusting a region in which the subsidiary carrier is transmitted after being beamformed in a macro cell, whose service is supported by the base station, the adjusting based on the interference information.

5. The method according to claim 1, further comprising:
determining a weight vector for forming a beamforming to be applied to reference signals;
transmitting reference signal operation information including at least information associated with an order of beamforming to be applied to one of the reference signals or information associated with a number of antennas; and
transmitting one of the reference signals upon which the beamforming has been performed.

6. The method according to claim 5, wherein the weight vector for forming the beamforming is determined such that a different weight vector is applied to a cell common reference signal according to each of a plurality of frequency segments that comprise an available system band.

7. The method according to claim 1, further comprising:
transmitting, to a user equipment of the plurality of user equipment, information associated with a subsidiary carrier transmission, the information including a weight vector for forming a beamforming to be applied to the subsidiary carrier and information associated with time/frequency resources to which a beamforming weight is applied;
receiving, from the user equipment, feedback information using the subsidiary carrier, the feedback information including a channel measurement result; and
performing carrier aggregation upon the subsidiary carrier using the feedback information.

8. A method for a user equipment to receive a signal in a heterogeneous network, the method comprising:
receiving, from a base station, information associated with a weight vector set including one or more weight vectors that can be applied to reference signals carried by a subsidiary carrier through downlink control signals carried by a primary carrier;
receiving, from the base station, the reference signals to which each of the one or more weight vectors included in the weight vector set has been applied;
transmitting, to the base station, feedback information associated with a channel measurement result for the reference signals;
receiving, from the base station, weight vector information applied to a downlink signal carried by the subsidiary carrier, the weight vector information determined based on the feedback information; and
receiving, from the base station, the downlink signal carried by the subsidiary carrier to which the weight vector information has been applied.

9. The method according to claim 8, further comprising:
performing a channel measurement using a downlink signal received from the base station;
transmitting, to the base station, feedback information including interference information associated with interference between a plurality of cells related to the channel measurement.

10. The method according to claim 8, wherein the subsidiary carrier and the primary carrier are transmitted through different frequency segments from among a plurality of frequency segments that comprise an available system band.

11. A base station in a heterogeneous network, the base station comprising:
a transmission module configured to transmit a radio signal;
a reception module configured to receive a radio signal; and
a processor configured to:
determine a weight vector for forming a beam pattern to be applied to a subsidiary carrier that is transmitted through the transmission module;
control the transmitting module to transmit, to a plurality of user equipment, information associated with a weight vector set, the weight vector set including one or more weight vectors that can be applied to reference signals carried by the subsidiary carrier through downlink control signals carried by a primary carrier;
control the transmitting module to transmit, to the plurality of user equipment, the reference signals to which each of the one or more weight vectors included in the weight vector set has been applied;
control the reception module to receive, from the plurality of user equipment, feedback information associated with a channel measurement result for the reference signals;
determine a weight vector information applied to downlink signals carried by the subsidiary carrier, the weight vector information determined based on the feedback information, wherein the weight vector information is specific to each user equipment of the plurality of user equipment;
control the transmitting module to transmit, to each user equipment of the plurality of user equipment, the determined weight vector information; and
control the transmitting module to transmit, to each user equipment of the plurality of user equipment, the downlink signals carried by the subsidiary carrier using the determined weight vector information.

12. A user equipment in a heterogeneous network, the user equipment comprising:
a reception module configured to receive a radio signal;
a transmission module configured to transmit a radio signal; and
a processor configured to:
perform a channel measurement based on a downlink signal received through the reception module;
control the reception module to receive, from a base station, information associated with a weight vector set, the weight vector set including one or more weight vectors that can be applied to reference signals carried by a subsidiary carrier through downlink control signals carried by a primary carrier;
control the reception module to receive, from the base station, the reference signals to which each of the one or more weight vectors included in the weight vector set has been applied;
control the transmitting module to transmit, to the base station, feedback information associated with a channel measurement result for the reference signals;
control the reception module to receive, from the base station, weight vector information applied to a downlink signal carried by the subsidiary carrier, the weight vector information determined based on the feedback information; and control the reception module to receive, from the base station, downlink signals carried by the subsidiary carrier to which the weight vector information has been applied.

13. The user equipment according to claim 12, wherein the processor is further configured to:
   perform a channel measurement of the downlink signal to which each of the one or more weight vectors included in the weight vector set has been applied;
   generate feedback information associated with a result of the channel measurement; and
   control the transmitting module to transmit, to the base station, the feedback information.

14. The user equipment according to claim 12, wherein the feedback information includes interference information related to interference between a plurality of cells in association with the channel measurement.

15. The user equipment according to claim 12, wherein the processor is further configured to:
   control the reception module to receive, from the base station, a weight vector for forming a beamforming to be applied to the subsidiary carrier and information associated with time/frequency resources to which a beamforming weight is applied
   generate feedback information using the subsidiary carrier, the feedback information including a channel measurement result using the subsidiary carrier; and
   control the transmitting module to transmit, to the base station, the feedback information.

* * * * *